United States Patent
Moon et al.

(10) Patent No.: US 10,814,859 B2
(45) Date of Patent: Oct. 27, 2020

(54) HYBRID ELECTRIC VEHICLE AND METHOD OF CONTROLLING SHIFT THEREOF

(71) Applicants: Hyundai Motor Company, Seoul (KR); Kia Motors Corporation, Seoul (KR)

(72) Inventors: Seong Wook Moon, Seoul (KR); Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 121 days.

(21) Appl. No.: 16/203,029

(22) Filed: Nov. 28, 2018

(65) Prior Publication Data

US 2019/0176796 A1   Jun. 13, 2019

(30) Foreign Application Priority Data

Dec. 7, 2017   (KR) .......................... 10-2017-0167258

(51) Int. Cl.
| | |
|---|---|
| *B60W 10/08* | (2006.01) |
| *B60W 10/10* | (2012.01) |
| *B60W 30/19* | (2012.01) |
| *F16H 59/38* | (2006.01) |
| *B60W 20/20* | (2016.01) |
| *F16H 61/04* | (2006.01) |
| *F16H 63/50* | (2006.01) |
| *F16H 59/40* | (2006.01) |

(52) U.S. Cl.
CPC ............ *B60W 10/08* (2013.01); *B60W 10/10* (2013.01); *B60W 20/20* (2013.01); *B60W 30/19* (2013.01); *F16H 59/38* (2013.01); *F16H 61/0403* (2013.01); *F16H 63/502* (2013.01); *B60Y 2200/92* (2013.01); *F16H 2059/405* (2013.01); *F16H 2061/0422* (2013.01)

(58) Field of Classification Search
None
See application file for complete search history.

(56) References Cited

U.S. PATENT DOCUMENTS

| | | | | |
|---|---|---|---|---|
| 2008/0119975 | A1* | 5/2008 | Yamazaki | ................ B60K 6/48 701/22 |
| 2016/0318500 | A1* | 11/2016 | Ohn | ...................... B60W 10/08 |
| 2017/0144651 | A1* | 5/2017 | Park | ...................... B60W 10/06 |
| 2017/0297554 | A1* | 10/2017 | Lee | ....................... B60W 20/30 |

* cited by examiner

*Primary Examiner* — Timothy Hannon
(74) *Attorney, Agent, or Firm* — Slater Matsil, LLP

(57) ABSTRACT

Disclosed are a hybrid electric vehicle which may minimize fuel efficiency loss by shift intervention, and a method of controlling shift thereof. The method of controlling shift of the hybrid electric vehicle includes predicting torque of an input terminal of a transmission at a shift time, predicting an RPM of a motor at the shift time, predicting a quantity of intervention using the predicted torque of the input terminal of the transmission and the predicted RPM of the motor, determining whether or not intervention using the motor alone at the shift time is feasible based on the predicted quantity of intervention, and executing shift corresponding to a result of the determination.

19 Claims, 9 Drawing Sheets

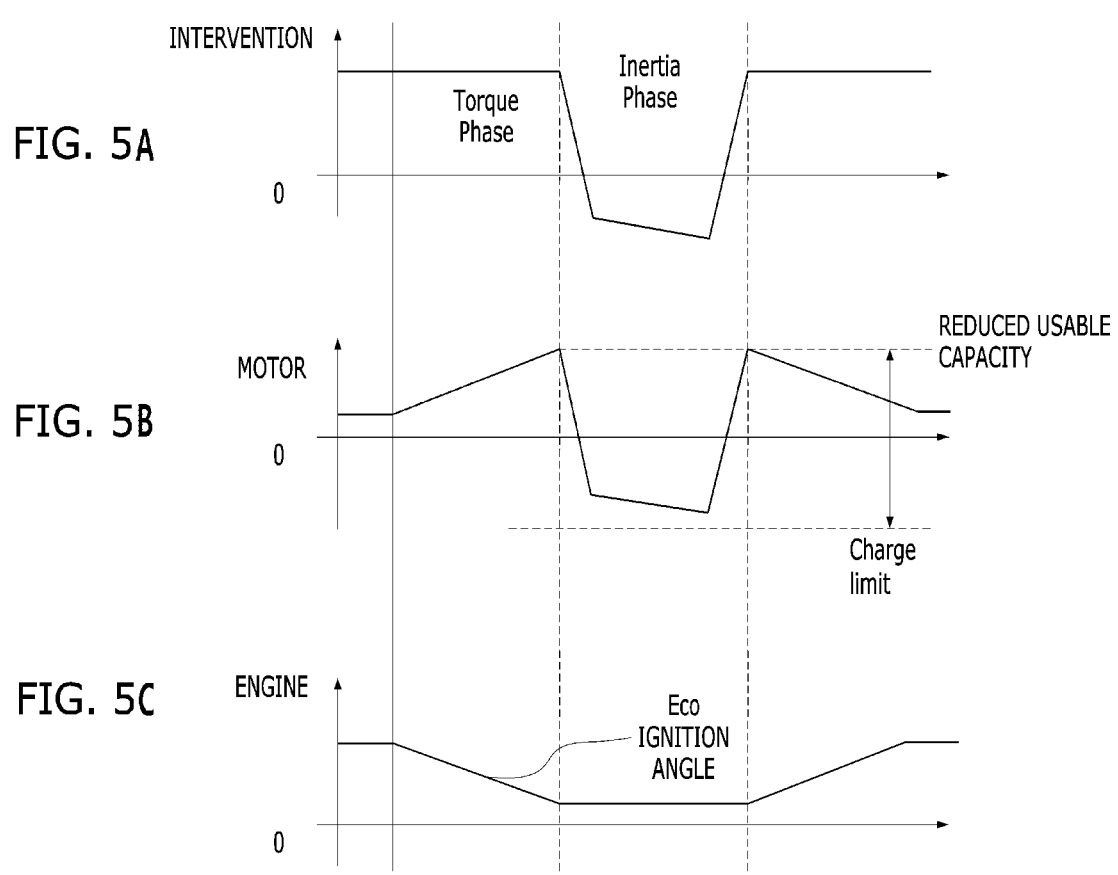

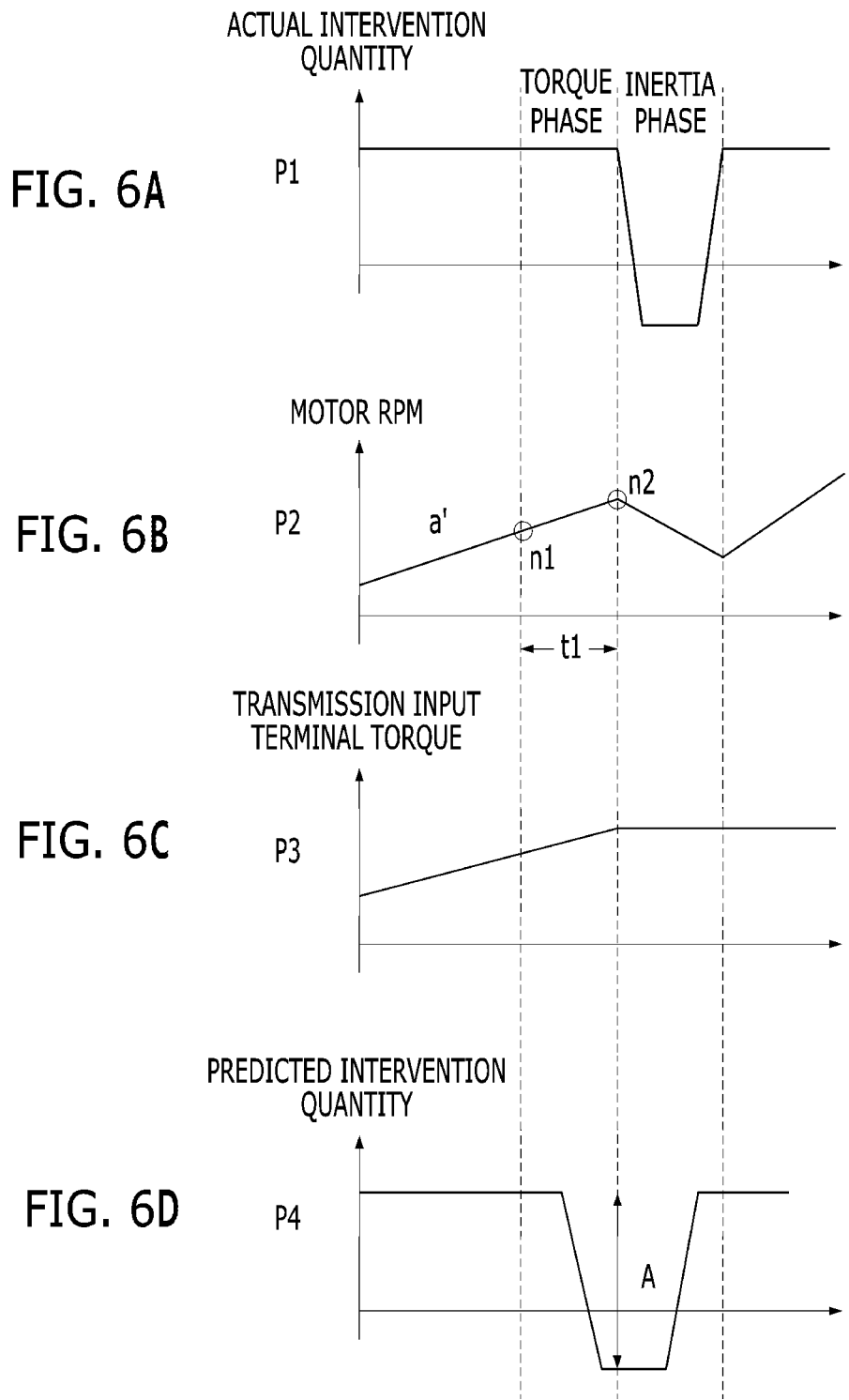

HYBRID ELECTRIC VEHICLE AND METHOD OF CONTROLLING SHIFT THEREOF

CROSS-REFERENCE TO RELATED APPLICATIONS

This application claims priority to Korean Patent Application No. 10-2017-0167258, filed in the Korean Intellectual Property Office on Dec. 7, 2017, which application is hereby incorporated herein by reference.

TECHNICAL FIELD

The present invention relates to a hybrid electric vehicle and a method of controlling an engine thereof.

BACKGROUND

In general, demand for eco-friendly vehicles is increasing according to demand for improvement in fuel efficiency of vehicles and reinforcement of emission regulations of respective countries. Hybrid electric vehicles/plug-in hybrid electric vehicles (HEVs/PHEVs) are provided as a realistic alternative.

Such a hybrid electric vehicle may provide optimum output and torque according to how two power sources, i.e., an engine and a motor, are harmoniously operated during a process of driving the hybrid electric vehicle using the engine and the motor. Particularly, in a hybrid electric vehicle employing a parallel type or Transmission Mounted Electric Device (TMED) type hybrid system in which an electric motor and an engine clutch (EC) are mounted between an engine and a transmission, output of the engine and output of the motor may be simultaneously transmitted to a drive shaft.

In a general situation of a hybrid electric vehicle, in initial acceleration, electric energy is used (i.e., an EV mode). However, since there is a limit in satisfying driver's request power using electric energy alone, a moment at which an engine is used as a main power source occurs (i.e., an HEV mode). In this case, in the hybrid electric vehicle, when a difference between an RPM of a motor and an RPM of the engine is within a designated range, an engine clutch is closed so that the motor and the engine are rotated simultaneously. Such a structure of the hybrid electric vehicle will be described with reference to FIG. 1.

FIG. 1 is a view illustrating one example of a powertrain structure of a general hybrid electric vehicle.

FIG. 1 illustrates a powertrain of a hybrid electric vehicle employing a parallel type hybrid system in which an electric motor (or a driving motor) 140 and an engine clutch 130 are mounted between an internal combustion engine (ICE) 110 and a transmission 150.

In such a hybrid electric vehicle, if a driver presses an accelerator pedal after starting (i.e., the accelerator pedal is turned on), the motor 140 is first driven using power of a battery under the condition that the engine clutch 130 is opened, and power of the motor 140 is transmitted to wheels via the transmission 150 and a final drive (FD) 160 and thus the wheels are moved (i.e., the EV mode). When the vehicle is gradually accelerated and thus requires greater driving power, an auxiliary motor (or a starter generator motor) 120 is operated and may thus drive the ICE 110.

Thereby, when RPMs of the ICE 110 and the motor 140 become equal, the engine clutch 130 is closed and thus the vehicle is driven using both the ICE 110 and the motor 140 (i.e., transition from the EV mode to the HEV mode). When a predetermined engine off condition, such as deceleration of the vehicle, is satisfied, the engine clutch 130 is opened and the ICE 110 is stopped (i.e., transition from the HEV mode to the EV mode). Here, the vehicle charges the battery through the motor 140 using driving power of the wheels and, such a situation is referred to as regeneration of braking energy or regenerative braking. Therefore, the starter generator motor 120 functions as a starter motor when the ICE 110 is started and functions as a generator when rotational energy of the ICE 110 is recovered after starting or when the ICE 110 is turned off, and thus the starter generator motor 120 may be referred to as a hybrid starter generator (HSG).

In general, a stepped transmission or a multiple disc clutch transmission, for example, a dual clutch transmission (DCT), may be used as the automatic transmission 150. If the automatic transmission 150 executes shift, particularly, in an upshift process, in order to effectively execute shift and protect the engine clutch 130, the vehicle performs control of kinetic energy of an input shaft of the transmission 150, such as reduction of torque of the driving source, i.e., deceleration, and such control may be referred to as "intervention control." In a general vehicle, in order to perform intervention control, torque of an engine should be reduced and, in order to reduce the torque of the engine, air quantity control and ignition angle control may be considered. Hereinafter, the respective controls will be described.

First, air quantity control means a method in which output torque is controlled by adjusting current quantity of intake air and quantity of fuel through control of an engine throttle. Such a control method is advantageous in that fuel efficiency may be raised through control of an optimum ignition angle corresponding to the current quantity of intake air and quantity of fuel, but has a difficulty in precise control of a quantity of intake air and a quantity of fuel which are necessary to implement request torque due to characteristics of fluid behavior and thus has a limit in responsiveness to torque change. Accordingly, this control method has excellent efficiency but needs to endure a request torque tracking error and response delay.

Next, ignition angle control means a method in which efficiency is sacrificed for request torque tracking. In such a method, in order to implement request torque in consideration of slow fluid behavior, a quantity of air and a quantity of fuel greater than necessary quantities are first secured in cylinders of an engine (i.e., torque is reserved). If an ignition angle of an ignition plug is delayed so as to implement necessary torque at the excessive quantities of air and fuel, efficiency is lowered but torque accuracy and responsiveness may be secured.

Consequently, shift intervention control is generally implemented through ignition angle control so as to secure rapid response to engine torque reduction. However, if ignition angle control is performed, as described above, the same fuel injection quantity is obtained but engine output is reduced, as compared to normal control, and thus fuel efficiency is lowered. Further, since engine torque is lowered by shift invention control regardless of a control method of reducing engine torque, wheel torque is also lowered and thus passengers may feel a sense of torque disconnectedness during shifting.

However, in the hybrid electric vehicle, reverse torque may be applied to the electric motor 140 as a driving source torque reduction means and, in this case, the electric motor 140 may perform power generation. This operation will be described with reference to FIGS. 2A to 2C.

FIGS. 2A to 2C are graphs illustrating one example of an intervention process for upshift of a general hybrid electric vehicle.

FIGS. 2A to 2C illustrate three graphs, and vertical axes of the graphs of FIGS. 2A to 2C respectively represent intervention, torque of an electric motor and speed of an input shaft of a transmission.

A shift process may be generally divided into a torque phase and an inertia phase. The torque phase may mean a phase in which the speed of the input shaft is increased. Further, the inertia phase may mean a phase in which torque of the input shaft is reduced and thus the speed of the input shaft is decreased. Further, application of torque in a reverse direction, i.e., reverse torque (−), to the electric motor may mean power generation. Therefore, power produced through power generation of the electric motor is used to charge a battery.

However, in some cases, a quantity of intervention may not be satisfied by the electric motor alone. Such a case will be described with reference to FIGS. 3A to 3C.

FIGS. 3A to 3C are graphs exemplarily illustrating problems generated during the intervention process in the general hybrid electric vehicle.

With reference to FIGS. 3A to 3C, a quantity of intervention which may be afforded by the electric motor is the sum of a current torque value and a reverse torque value corresponding to a charge limit and, if an intervention requirement (in FIG. 3A) exceeds the quantity of intervention which may be afforded by the electric motor, an additional quantity of intervention may be satisfied through an engine (i.e., ignition angle delay). However, as described above, ignition angle delay may lower fuel efficiency.

Further, failure in predicting the quantity of intervention may also cause lowering of fuel efficiency. For example, if it is predicted that the quantity of intervention cannot be afforded by the electric motor and, thus, ignition angle delay control is performed but a quantity of intervention which is actually required can afforded by the electric motor, engine efficiency is lowered. As another example, if torque of the engine is reduced in advance but the electric motor cannot handle the overall quantity of intervention and, thus, ignition angle delay control is additionally performed, engine efficiency is also lowered.

Consequently, even in a hybrid electric vehicle, if the above-described hardware limit (for example, limit in the power generation capacity of the electric motor) occurs or prediction of a quantity of intervention fails, efficiency may be lowered.

SUMMARY

The present invention relates to a hybrid electric vehicle and a method of controlling an engine thereof, and particular embodiments, to a hybrid electric vehicle which may minimize fuel efficiency loss by shift intervention and a method of controlling the same.

Accordingly, embodiments of the present invention are directed to a hybrid electric vehicle and a method of controlling shift thereof that substantially obviate one or more problems due to limitations and disadvantages of the related art.

Embodiments of the present invention can provide a method of effectively performing shift intervention control in a hybrid electric vehicle, and a vehicle performing the same.

Other embodiments of the present invention can provide a method of controlling shift of a hybrid electric vehicle in which accuracy in prediction of a quantity of shift intervention may be raised and intervention of an engine may be minimized, and a vehicle performing the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

An exemplary embodiment of the invention relates to a method of controlling shift of a hybrid electric vehicle that includes predicting torque of an input terminal of a transmission at a shift time, predicting an RPM of a motor at the shift time, predicting a quantity of intervention using the predicted torque of the input terminal of the transmission and the predicted RPM of the motor, determining whether or not intervention using the motor alone at the shift time is feasible based on the predicted quantity of intervention, and executing shift corresponding to a result of the determination.

In another aspect of the present invention, a hybrid electric vehicle includes a first control unit configured to predict torque of an input terminal of a transmission and an RPM of a motor at a shift time, and a second control unit configured to control the transmission, to predict a quantity of intervention using the predicted torque of the input terminal of the transmission and the predicted RPM of the motor and to transmit the predicted quantity of intervention to the first control unit. The first control unit determines whether or not intervention using the motor alone at the shift time is feasible based on the predicted quantity of intervention and transmits a torque command corresponding to a result of the determination to a third control unit controlling the motor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5A to 5C are graphs illustrating one example of torque redistribution in accordance with one embodiment of the present invention;

FIGS. 6A to 6D are graphs illustrating one example of a process of predicting a quantity of intervention in accordance with one embodiment of the present invention;

DETAILED DESCRIPTION OF ILLUSTRATIVE EMBODIMENTS

Figure 1:
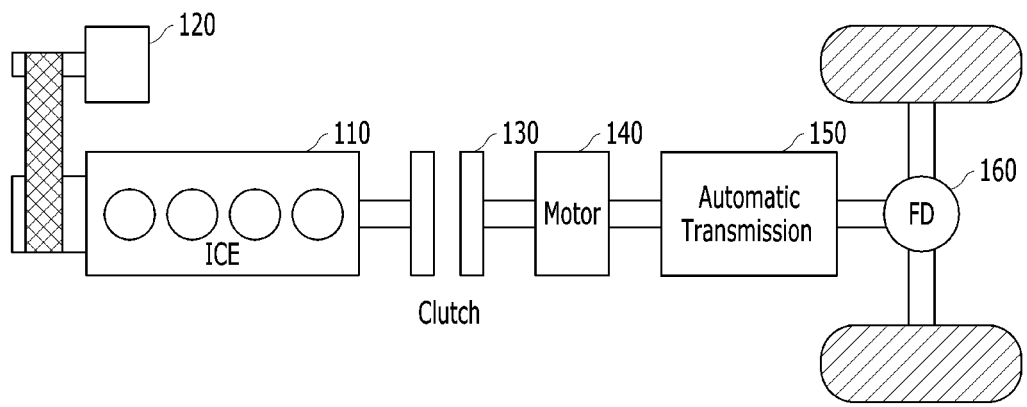
FIG. 1 is a view illustrating one example of a powertrain structure of a general hybrid electric vehicle.
Figure 2A:
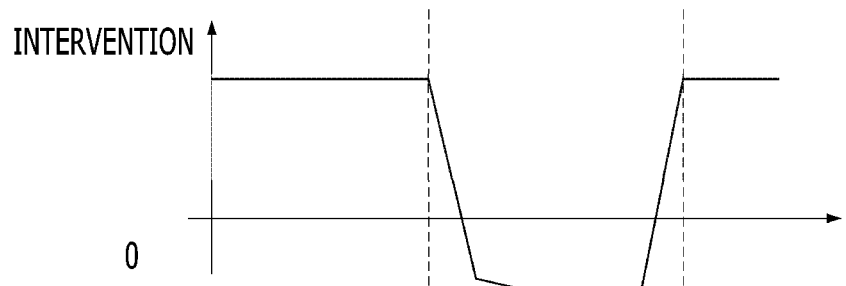
FIGS. 2A to 2C are graphs illustrating one example of an intervention process for upshift of a general hybrid electric vehicle.
Figure 2B:
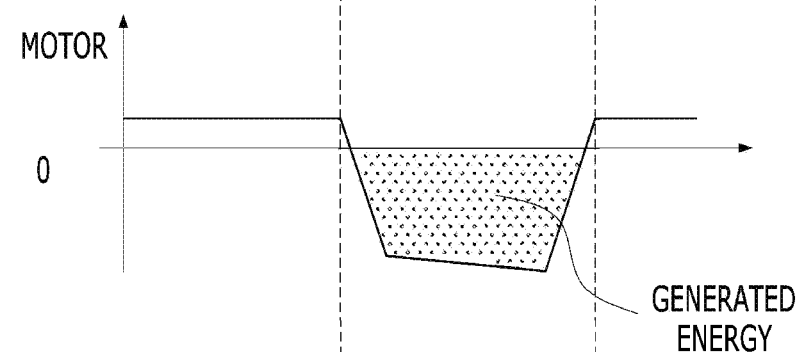
Figure 2C:
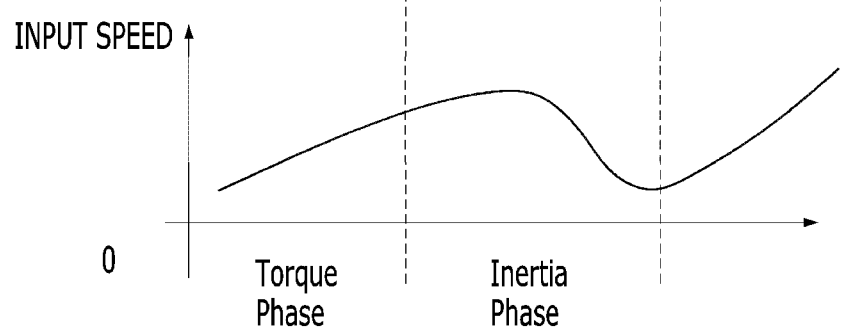
Figure 3A:
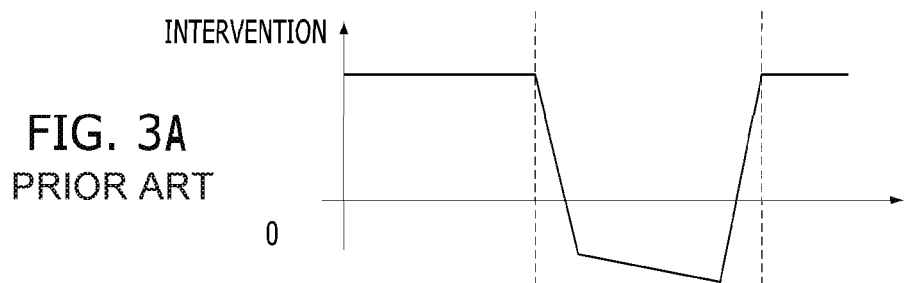
FIGS. 3A to 3C are graphs exemplarily illustrating problems generated during the intervention process in the general hybrid electric vehicle.
Figure 3B:
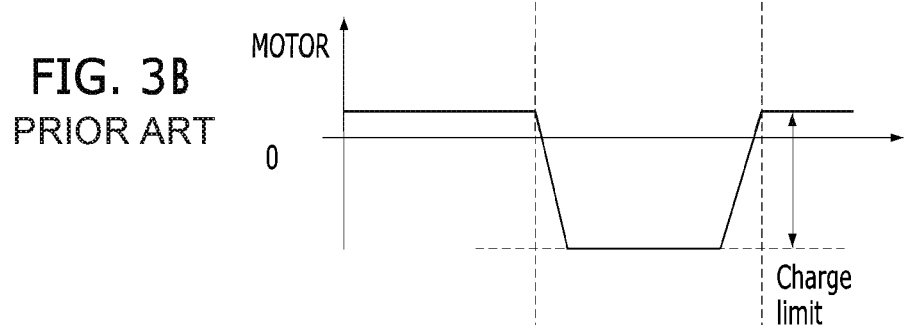
Figure 3C:
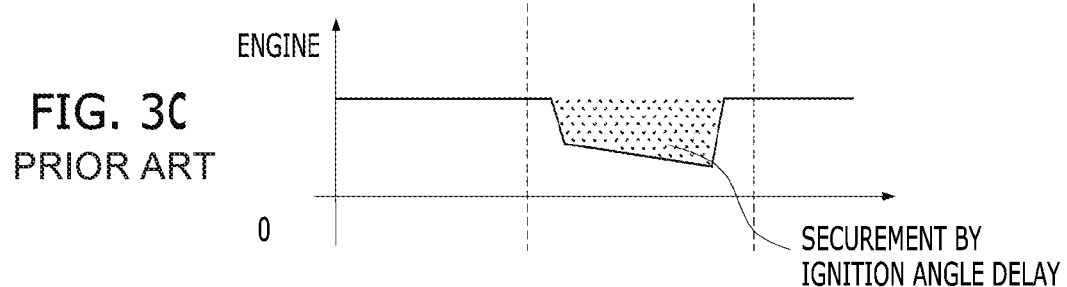

Reference will now be made in detail to the preferred embodiments of the present invention, examples of which are illustrated in the accompanying drawings. However, the disclosure of the invention is not limited to the embodiments set forth herein and may be variously modified. In the drawings, in order to clearly describe the present invention, description of elements which are not related to the present invention is omitted, and the same or similar elements are denoted by the same reference numerals even though they are depicted in different drawings.

In the following description of the embodiments, it will be understood that, when a part "includes" an element, the part may further include other elements and does not exclude presence of the elements, unless stated otherwise. In the drawings, the same or similar elements are denoted by the same reference numerals even though they are depicted in different drawings.

Prior to description of a method of controlling shift in accordance with one embodiment of the present invention, mutual relations among powertrain control units which are applicable to the embodiment will be described with reference to FIG. 4. A configuration of FIG. 4 may be applied to a hybrid electric vehicle having the above-described powertrain structure of FIG. 1.

Figure 4:
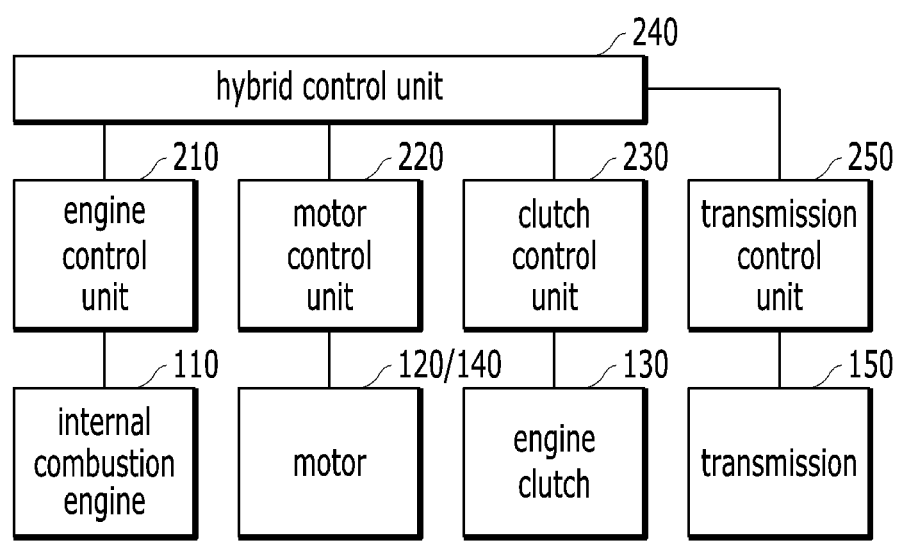
FIG. 4 is a block diagram illustrating one example of a control system of a hybrid electric vehicle which is applicable to one embodiment of the present invention.

FIG. 4 is a block diagram illustrating one example of a control system of a hybrid electric vehicle which is applicable to one embodiment of the present invention.

With reference to FIG. 4, in the hybrid electric vehicle to which embodiments of the present invention are applicable, an internal combustion engine 110 may be controlled by an engine control unit 210, torques of a starter generator motor 120 and an electric motor 140 may be controlled by a motor control unit (MCU) 220, and an engine clutch 130 may be controlled by a clutch control unit 230. Here, the engine control unit 210 may be referred to as an engine management system (EMS). Further, a transmission 150 is controlled by a transmission control unit 250. In some cases, the starter generator motor 120 and the electric motor 140 may be respectively controlled by separate control units.

The respective control units are connected to an upper-level control unit, i.e., a hybrid control unit (HCU) 240 which performs the entirety of a mode conversion process, and may thus provide information necessary to control the engine clutch 130 in driving mode conversion and gear shift and/or information necessary to control stoppage of the internal combustion engine 110 to the hybrid control unit 240 or perform operation according to a control signal under the control of the hybrid control unit 240.

In more detail, the hybrid control unit 240 determines whether or not mode conversion is performed according to a driving state of the vehicle. For example, the hybrid control unit 240 determines a point in time when the engine clutch 130 is opened, and performs hydraulic pressure control (if the engine clutch 130 is a wet engine clutch) or torque capacity control (if the engine clutch 130 is a dry engine clutch) when the engine clutch 130 is opened. Further, the hybrid control unit 240 may determine a state (lock-up, slip or opening) of the engine clutch 130 and control a point in time when fuel injection of the internal combustion engine 110 is stopped. Further, in order to control stoppage of the internal combustion engine 110, the hybrid control unit 240 may transmit a torque command to control torque of the starter generator motor 120 to the motor control unit 220 and thus control recovery of engine rotational energy. Moreover, the hybrid control unit 240 may calculate Distance to Empty (DTE) information according to a battery SOC by learning past driving data and employing current driving data.

Of course, connection relations among the above-described control units and functions/divisions of the respective control units are exemplary and thus it will be apparent to those skilled in the art that the names of the control units are not limited. For example, any one of other control units except for the hybrid control unit 240 may be implemented as having the functions of the hybrid control unit 240, or the functions of the hybrid control unit 240 may be distributed to two or more other control units except for the hybrid control unit 240.

Hereinafter, based on the above-described vehicle configuration, a method of controlling shift in accordance with one embodiment of the present invention will be described.

One embodiment of the present invention proposes prediction of a quantity of intervention before shift occurs and redistribution of torque to the powertrain according to a result of prediction.

For this purpose, the transmission control unit 250 may predict a quantity of intervention which will be generated, using currents RPMs of an Accelerator Pedal Sensor (APS) and an input shaft of the transmission 15$o$, and transmit the predicted quantity of intervention to the hybrid control unit 240. Further, the hybrid control unit 240 may determine whether or not torque redistribution is feasible based on the predicted quantity of intervention received from the transmission control unit 250, and, if torque redistribution is feasible, determine redistributed torque quantities and transmit corresponding torque commands to the motor control unit 220 and the engine control unit 210.

Torque redistribution will be described in more detail with reference to FIGS. 5A to 5C.

FIGS. 5A to 5C are graphs illustrating one example of torque redistribution in accordance with one embodiment of the present invention. In FIGS. 5A to 5C, it is assumed that a quantity of intervention is accurately predicted.

With reference to FIGS. 5A to 5C, if the quantity of intervention is predicted but it is determined that the entirety of the quantity of intervention cannot be afforded by the motor alone in consideration of a current operating state, i.e., output torque, of the motor, torque of the electric motor may be raised in advance by a shortfall but torque of the engine may be reduced as much, in the torque phase. The reason for this is to reduce torque of the engine by the torque increment of the electric motor so as to maintain the overall quantity of torque. Here, reduction in torque of the engine may be performed throughout the torque phase and, thus, rapid ignition angle perception is not necessary. Therefore, a method having low decline in fuel efficiency, for example, the air quantity control method, may be applied but the disclosure is not limited thereto.

Accordingly, through torque redistribution of FIGS. 5A to 5C, reduction in torque of the engine in the inertia phase is not necessary, and the quantity of intervention is satisfied by the electric motor alone and, thus, efficiency is improved.

Hereinafter, a method of predicting a quantity of intervention will be described with reference to FIGS. 6A to 6D.

FIGS. 6A to 6D are graphs illustrating one example of a process of predicting a quantity of intervention in accordance with one embodiment of the present invention.

FIGS. 6A to 6D illustrate four graphs P1 to P4. The graphs P1 to P4 share one horizontal axis representing time, a vertical axis of the graph P1 represents an actual quantity (requirement) of intervention, a vertical axis of the graph P2 represents an RPM of a motor, the vertical axis of the graph P3 represents torque of an input terminal of a transmission, and a vertical axis of the graph P4 represents a quantity of intervention, predicted by a vehicle, respectively.

In accordance with this embodiment, a quantity of intervention may be determined by an RPM of the motor and torque of an input terminal of the transmission when the vehicle enters the torque phase. Therefore, prediction of the quantity of intervention may mean prediction of the RPM of the motor and the torque of the input terminal of the transmission when the vehicle enters the torque phase.

With reference to the graph P2, an RPM n2 of the motor when the vehicle enters the inertia phase may be calculated by raising an RPM n1 of the motor when the vehicle enters the torque phase along a slope a' when control is started (i.e., prior to the torque phase) for a time t1 corresponding to the torque phase (which is determinable by the transmission control unit). Therefore, the RPM n2 of the motor when the vehicle enters the inertia phase may be calculated by equation "n2=a'*t1+n1" or "n2=f(t1, APS, etc)t1+n1".

Similarly, torque of an input terminal of the transmission shown in the graph P3 may be predicted based on the APS. For example, the torque of the input terminal of the transmission when the vehicle enters the inertia phase may be calculated by equation "f(APS, t1)+current input terminal torque" or "f(t1, APS, etc)+current input terminal torque".

Accordingly, when the RPM of the motor and the torque of the input terminal of the transmission when the vehicle enters the inertia phase are predicted through the above-described method, a predicted quantity A of intervention may be determined in the torque phase, as exemplarily shown in the graph P4.

Hereinafter, a subsequent control process according to the quantity of intervention predicted through the method described with reference to FIGS. 6A to 6D will be described with reference to FIGS. 7A to 7C.

Figure 7A:
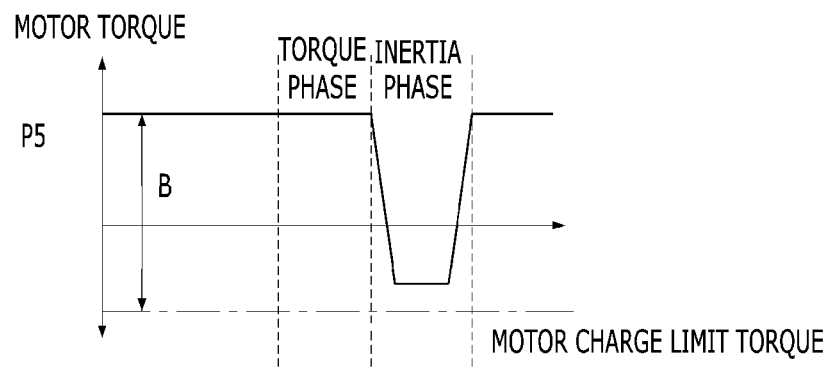
FIGS. 7A to 7C are graphs illustrating one example of a process of performing effective shift control according to a predicted quantity of intervention in accordance with one embodiment of the present invention.
Figure 7B:
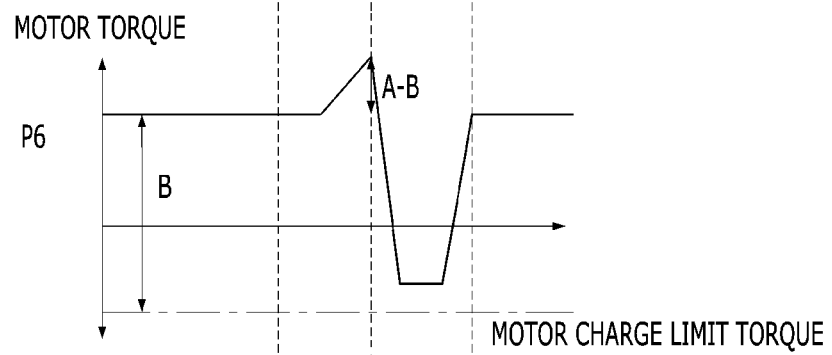
Figure 7C:
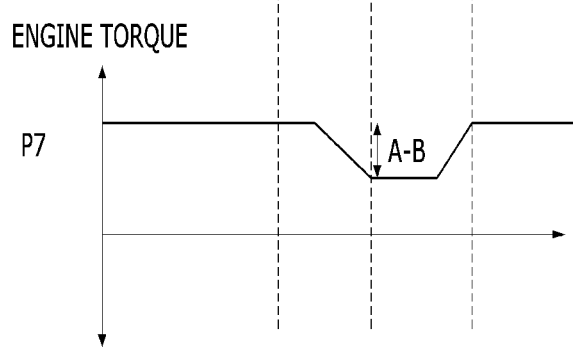

FIGS. 7A to 7C are graphs illustrating one example of a process of performing effective shift control according to a predicted quantity of intervention in accordance with one embodiment of the present invention. The process shown in FIGS. 7A to 7C is subsequent to the process shown in FIGS. 6A to 6D and, in this process, it is assumed that the predicted quantity of intervention is the same as the predicted quantity A of intervention of FIG. 6D.

FIGS. 7A to 7C illustrate three graphs P5 to P7. The graphs P5 to P7 share one horizontal axis representing time, vertical axes of the graphs P5 and P6 represent torque of the motor, and a vertical axis of the graph P7 represents torque of the engine. Further, "B" in the graphs P5 and P6 represents a quantity of intervention which may be afforded by the motor when the vehicle enters shift control, and the quantity of intervention corresponds to the sum of output torque of the motor and charge limit torque, as described above.

As exemplarily shown in the graph P5, if the predicted quantity A of intervention is less than the quantity B of intervention which may be afforded by the motor, the entirety of the predicted quantity A of intervention is satisfied through torque control of the motor in the inertia phase.

Differently, as exemplarily shown in the graph P6, if the predicted quantity A of intervention is greater than the quantity B of intervention which may be afforded by the motor, torque of the motor may be raised by a difference (A−B) between the two quantities A and B in the torque phase before the vehicle enters the inertia phase. Thereby, the actual quantity of intervention which is afforded by the motor in the inertia phase is increased and thus the entirety of the predicted quantity A of intervention may be satisfied by the motor alone. Instead, torque of the engine is reduced by the torque increment of the motor in the inertia phase.

Through the above-described method, a quantity of intervention may be predicted, the predicted quantity of intervention may be compared to a quantity of intervention which may be afforded by the motor, and torque redistribution is performed in the torque phase according to a result of comparison, thus preventing intervention control of the engine in the inertia phase. In some embodiments, when reduction in torque of the engine is necessary according to control of rise in torque of the motor, if the reduced engine torque deviates from an optimum efficiency driving point of the engine by a designated level or more, such a power redistribution process may not be performed.

The above-described process will be described with reference to FIG. 8.

Figure 8:
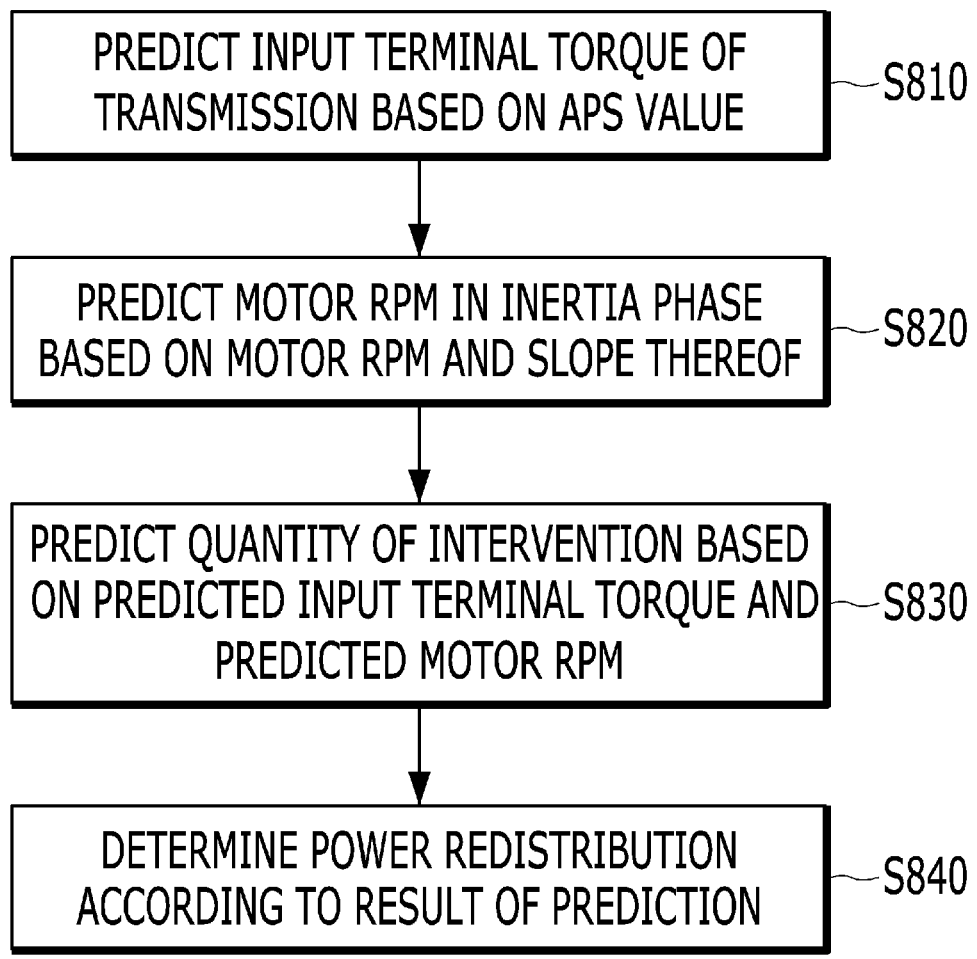
FIG. 8 is a flowchart illustrating one example of a process of controlling shift of a hybrid electric vehicle in accordance with one embodiment of the present invention.
Figure 9A:
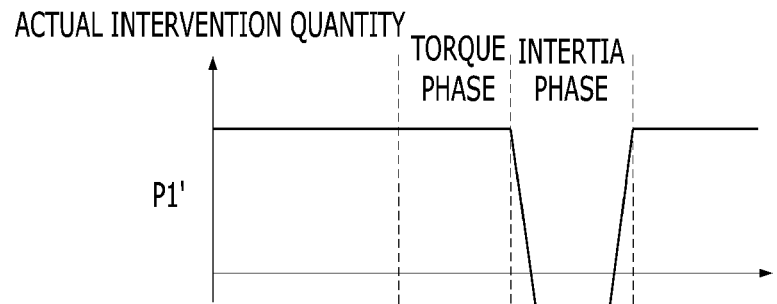
FIGS. 9A to 9D are graphs illustrating one example of a process of controlling shift of a hybrid electric vehicle in accordance with another embodiment of the present invention.
Figure 9B:
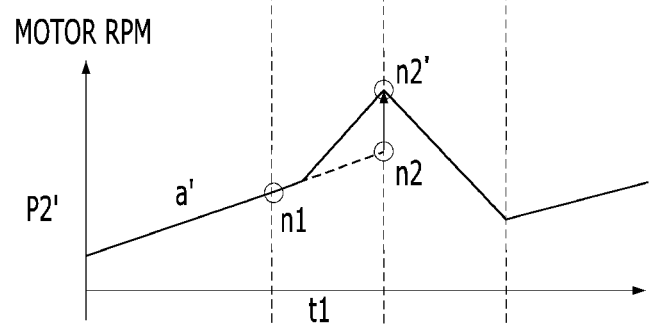
Figure 9C:
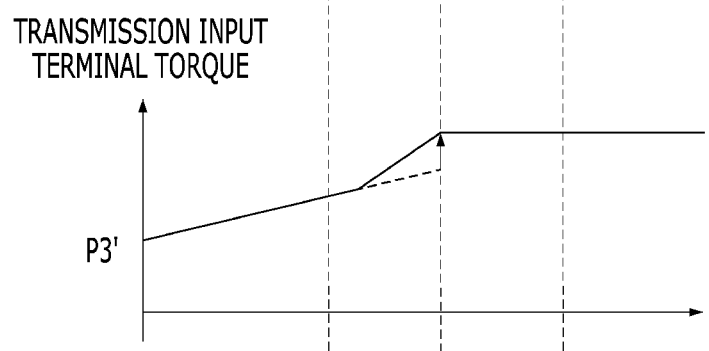
Figure 9D:
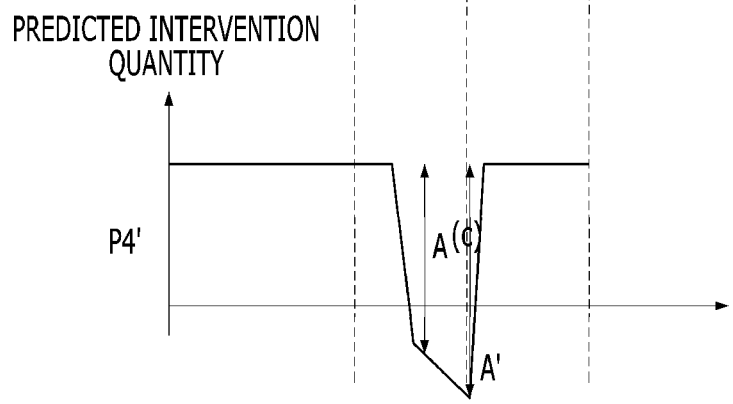

FIG. 8 is a flowchart illustrating one example of a process of controlling shift of a hybrid electric vehicle in accordance with one embodiment of the present invention.

With reference to FIG. 8, torque of the input terminal of the transmission may be predicted based on a value of the APS according to an opening degree of the accelerator pedal pressed by a driver (Operation S810), and an RPM of the motor during shifting may be predicted through an upward slope of the RPM of the motor (Operation S820). Here, prediction of the torque of the input terminal of the transmission may be performed by the hybrid control unit, and prediction of the RPM of the motor may be performed by the hybrid control unit or the transmission control unit.

The predicted values of the torque of the input terminal of the transmission and the RPM of the motor may be values predicted at a point in time when the inertia phase is started, and a method of predicting the torque of the input terminal of the transmission and the RPM of the motor is the same as the above-described method in FIGS. 6A to 6D and a detailed description thereof will thus be omitted.

The transmission control unit may predict a quantity of intervention based on the predicted RPM of the motor and the predicted torque of the input terminal of the transmission (Operation S830). In prediction of the quantity of intervention, a calculation method using a predetermined function may be used or a method in which a predetermined map or lookup table is referred to may be used, but the disclosure is not limited thereto.

Thereafter, the transmission control unit may transmit the predicted quantity of intervention to the hybrid control unit, and the hybrid control unit may determine whether or not intervention of the engine is avoidable by comparing the predicted quantity of intervention to a quantity of intervention which may be afforded by the motor (Operation S840). According to a result of determination, the hybrid control unit may transmit a torque command to the motor control unit so that intervention is performed by the electric motor alone, or determine redistribution quantities of power so that power is redistributed in the torque phase and transmit torque commands respectively corresponding to the redistribution quantities of power to the engine control unit and the motor control unit.

In accordance with another embodiment of the present invention, near future predicted correction to predict torque of an input terminal of the transmission and an RPM of the motor at a more accurate shift time may be introduced. In this embodiment, a control process in the inertia phase is the same as that in the former embodiment shown in FIG. 8 and only a prediction process is different from that in the former embodiment. Therefore, a detailed description of parts in this embodiment which are substantially the same as those of the former embodiment will be omitted because it is considered to be unnecessary.

In this embodiment of the present invention, in order to perform near future predicted correction, information collected at the outside of the vehicle may be additionally considered. The information collected at the outside of the vehicle may be acquired by the vehicle via a wireless communication unit, such as a telematics module or an AVN system, from a telematics center or a separate server. The information collected at the outside of the vehicle may include past data of similar shift cases according to classification standards, such as kinds of shift (upshift, downshift, kick down shift, etc.), and a current vehicle driving state (speed change, request torque change, uphill/downhill driving, etc.), or correction parameters based on the past data, or be a near future predicted model function based on big data. Hereinafter, a prediction process in consideration of such information will be described with reference to FIGS. 9A to 9D.

FIGS. 9A to 9D are graphs illustrating one example of a process of controlling shift of a hybrid electric vehicle in accordance with another embodiment of the present invention.

Similarly to FIGS. 6A to 6D, FIGS. 9A to 9D illustrate four graphs P1' to P4'. The respective graphs P1' to P4' share one horizontal axis representing time, a vertical axis of the graph P1' represents an actual quantity (requirement) of intervention, a vertical axis of the graph P2' represents an RPM of a motor, the vertical axis of the graph P3' represents torque of a transmission input terminal, and a vertical axis of the graph P4' represents a quantity of intervention, predicted by a vehicle, respectively. It is assumed that an actual RPM n2' of the motor and torque of the input terminal of the transmission in this embodiment are raised and thus an actual quantity of intervention in this embodiment is increased, as compared to the embodiment shown in FIGS. 6A to 6D.

In the above-described former embodiment of the present invention shown in FIGS. 6A to 6D, since a quantity of intervention is determined by an RPM of the motor and torque of the input terminal of the transmission when the vehicle enters the torque phase, if the RPM of the motor or the torque of the input terminal of the transmission is changed in the torque phase, a final actual quantity of intervention is determined through feedback control according to change in the RPM of the motor and may thus be different from a predicted quantity of intervention.

On the other hand, in this embodiment, an initial quantity of intervention is calculated through the method shown in FIGS. 6A to 6D and FIG. 8, but a final quantity of intervention is corrected through feedback by performing near future predicted correction and, thus, accuracy may be improved.

For example, an initial predicted RPM of the motor and an initial predicted torque of the input terminal of the transmission at a point in time when the torque phase is started are calculated by the above-described method described with reference to FIGS. 6A to 6D and, when a final quantity of intervention is predicted, external data (case data) corresponding to a current driving state of the vehicle and state information (for example, aging state information) of the transmission are additionally considered by equation "f(predicted RPM, predicted input terminal torque)+f(shift case data, TM aging) and, thus, accuracy in prediction may be improved.

If such control is performed, Operation S830 of FIG. 8 may be changed, as below. For example, in Operation S830, the transmission control unit predicts a quantity of intervention additionally using near future prediction data, instead of prediction of the quantity of intervention using only the predicted RPM of the motor and the predicted torque of the input terminal of the transmission, and transmits the predicted quantity of intervention to the hybrid control unit.

Here, the near future prediction data may be received in advance from an AVN system or a telematics unit, and may include at least one of deviations in vehicles or power source torque deviations acquired through analysis of conventional similar shift case data, or correction data according to transmission hydraulic characteristics/hydraulic system aging degrees.

The above-described methods in accordance with the embodiments of the present invention may be implemented as computer readable code in a computer readable recording medium in which a program is recorded. Computer readable recording media include all kinds of recording devices in which data readable by computer systems is stored. For example, the computer readable recording media may include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As is apparent from the above description, a hybrid electric vehicle in accordance with at least one embodiment of the present invention may effectively perform shift control.

Particularly, the hybrid electric vehicle more accurately predicts a quantity of intervention prior to shift, redistributes torque to an engine and a motor in advance therethrough so as to minimize involvement of the engine in shift intervention, and thus improves efficiency.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of controlling shift of a hybrid electric vehicle, the method comprising:
   predicting torque of an input terminal of a transmission at a shift time;
   predicting an RPM (revolutions per minute) of a motor at the shift time;
   predicting a quantity of intervention using the predicted torque of the input terminal of the transmission and the predicted RPM of the motor;
   determining whether or not intervention using the motor alone at the shift time is feasible based on the predicted quantity of intervention; and executing shift corresponding to a result of the determination.

2. The method according to claim 1, wherein the prediction of the torque of the input terminal of the transmission is executed using a value of an accelerator pedal sensor.

3. The method according to claim 1, wherein the prediction of the RPM of the motor is executed at a start time of a first shift phase in which the RPM of the motor is increased, and wherein the shift time corresponds to a start time of a second shift phase executed subsequent to the first shift phase.

4. The method according to claim 3, wherein the prediction of the RPM of the motor is executed using an upward slope of the RPM of the motor prior to the start time of the first shift phase, a length of the first shift phase and an RPM of the motor at the start time of the first shift phase.

5. The method according to claim 3, wherein the determination as to whether or not the intervention using the motor alone is feasible comprises comparing the predicted quantity of intervention to a maximum quantity of intervention of the motor.

6. The method according to claim 5, wherein the execution of the shift comprises redistributing power between the motor and an engine prior to the second shift phase when it is determined that the intervention using the motor alone is infeasible.

7. The method according to claim 6, wherein the redistribution of power comprises:
adding torque corresponding to a difference between the predicted quantity of intervention and the maximum quantity of intervention of the motor to torque of the motor prior to the second shift phase; and
subtracting the torque corresponding to the difference from torque of the engine prior to the second shift phase.

8. The method according to claim 1, wherein the prediction of the quantity of intervention comprises correcting a feedback quantity of intervention by applying near future prediction information to the predicted torque of the input terminal of the transmission and the predicted RPM of the motor.

9. The method according to claim 8, wherein the near future prediction information comprises at least one of deviations in vehicles or power source torque deviations acquired through analysis of conventional similar shift case data, or correction data according to transmission hydraulic characteristics and hydraulic system aging degrees.

10. A computer readable recording medium having a program recorded therein to implement the method according to claim 1.

11. A hybrid electric vehicle comprising:
a first control unit configured to predict torque of an input terminal of a transmission and an RPM of a motor at a shift time; and
a second control unit configured to control the transmission, to predict a quantity of intervention using the predicted torque of the input terminal of the transmission and the predicted RPM of the motor and to transmit the predicted quantity of intervention to the first control unit;
wherein the first control unit is further configured to determine whether or not intervention using the motor alone at the shift time is feasible based on the predicted quantity of intervention and to transmit a torque command corresponding to a result of the determination to a third control unit controlling the motor.

12. The hybrid electric vehicle according to claim 11, wherein the first control unit is configured to predict the torque of the input terminal of the transmission using a value of an accelerator pedal sensor.

13. The hybrid electric vehicle according to claim 11, wherein the first control unit is configured to predict the RPM of the motor at a start time of a first shift phase in which the RPM of the motor is increased, wherein the shift time corresponds to a start time of a second shift phase executed subsequent to the first shift phase.

14. The hybrid electric vehicle according to claim 13, wherein the first control unit is configured to predict the RPM of the motor using an upward slope of the RPM of the motor prior to the start time of the first shift phase, a length of the first shift phase and an RPM of the motor at the start time of the first shift phase.

15. The hybrid electric vehicle according to claim 13, wherein the first control unit is configured to determine whether or not the intervention using the motor alone is feasible by comparing the predicted quantity of intervention to a maximum quantity of intervention of the motor.

16. The hybrid electric vehicle according to claim 15, wherein the first control unit is configured to redistribute power between the motor and an engine prior to the second shift phase when it is determined that the intervention using the motor alone is infeasible.

17. The hybrid electric vehicle according to claim 16, wherein the first control unit is configured to add torque corresponding to a difference between the predicted quantity of intervention and the maximum quantity of intervention of the motor to torque of the motor prior to the second shift phase, and to subtract the torque corresponding to the difference from torque of the engine prior to the second shift phase.

18. The hybrid electric vehicle according to claim 11, wherein the second control unit is configured to correct a feedback quantity of intervention by applying near future prediction information to the predicted torque of the input terminal of the transmission and the predicted RPM of the motor.

19. The hybrid electric vehicle according to claim 18, wherein the near future prediction information comprises at least one of deviations in vehicles or power source torque deviations acquired through analysis of conventional similar shift case data, or correction data according to transmission hydraulic characteristics and hydraulic system aging degrees.

* * * * *

UNITED STATES PATENT AND TRADEMARK OFFICE
CERTIFICATE OF CORRECTION

PATENT NO. : 10,814,859 B2
APPLICATION NO. : 16/203029
DATED : October 27, 2020
INVENTOR(S) : Seong Wook Moon Page 1 of 1

It is certified that error appears in the above-identified patent and that said Letters Patent is hereby corrected as shown below:

In the Claims

In Column 11, Line 48, Claim 10, delete "A computer readable recording medium" and insert
--A non-transitory computer readable recording medium--.

Signed and Sealed this
Ninth Day of March, 2021

Drew Hirshfeld
*Performing the Functions and Duties of the
Under Secretary of Commerce for Intellectual Property and
Director of the United States Patent and Trademark Office*